United States Patent
Weiss et al.

(10) Patent No.: US 7,266,284 B2
(45) Date of Patent: Sep. 4, 2007

(54) METHOD FOR CONTROLLING ONE OR MORE TEMPERATURE DEPENDENT OPTICAL PROPERTIES OF A STRUCTURE AND A SYSTEM AND PRODUCT THEREOF

(75) Inventors: Sharon M. Weiss, Rochester, NY (US); Philippe M. Fauchet, Pittsford, NY (US); Michael Molinari, Reims (FR)

(73) Assignee: University of Rochester, Rochester, NY (US)

( * ) Notice: Subject to any disclaimer, the term of this patent is extended or adjusted under 35 U.S.C. 154(b) by 12 days.

(21) Appl. No.: 10/826,502

(22) Filed: Apr. 16, 2004

(65) Prior Publication Data
US 2005/0018300 A1    Jan. 27, 2005

Related U.S. Application Data

(60) Provisional application No. 60/463,876, filed on Apr. 17, 2003.

(51) Int. Cl.
- G02B 6/00 (2006.01)
- G02B 6/34 (2006.01)
- G02B 6/10 (2006.01)
- H01L 21/00 (2006.01)

(52) U.S. Cl. .......................... 385/147; 385/12; 385/13; 385/37; 385/129; 385/130; 385/131; 385/132; 438/29; 438/30; 438/31; 438/32

(58) Field of Classification Search ................. 385/12, 385/37, 129–132, 147, 13; 438/29–32
See application file for complete search history.

(56) References Cited

U.S. PATENT DOCUMENTS

| | | | |
|---|---|---|---|
| 5,651,818 A | 7/1997 | Milstein et al. | |
| 5,682,401 A | 10/1997 | Joannopoulos et al. | |
| 5,740,287 A | 4/1998 | Scalora et al. | |
| 6,876,683 B2 * | 4/2005 | Watanabe et al. | 372/36 |
| 2002/0192680 A1 * | 12/2002 | Chan et al. | 435/6 |

OTHER PUBLICATIONS

Buttard et al., "X-Ray-Diffraction Investigation of the Anodic Oxidation of Porous Silicon", *J. Appl. Phys.* 79:8060-8070 (1996).
Buttard et al., "Porous Silicon Strain During in situ Ultrahigh Vacuum Thermal Annealing," *J. Appl. Phys.* 85:7105-7111 (1999).

(Continued)

*Primary Examiner*—Frank G. Font
*Assistant Examiner*—Jerry Martin Blevins
(74) *Attorney, Agent, or Firm*—Nixon Peabody LLP

(57) ABSTRACT

A method for controlling one or more temperature dependent optical properties of a structure in accordance with embodiments of the present invention includes heating at least a portion of a photonic band-gap structure and oxidizing the portion of the photonic band-gap structure during the heating to alter at least one temperature dependent optical property of the stack.

34 Claims, 8 Drawing Sheets

OTHER PUBLICATIONS

Yablonovitch et al., "Inhibited Spontaneous Emission in Solid-State Physics and Electronics," *Phys. Rev. Lett.* 58:2059-2062 (1987).

Bai et al., "Strain in Porous Si Formed on a Si (100) Substrate," *Appl. Phys. Lett.* 57:2247-2249 (1990).

Jellison et al., "The Temperature Dependence of the Refractive Index of Silicon at Elevated Temperatures at Several Laser Wavelengths," *J. Appl. Phys.* 60:841-843 (1986).

Martinez, G., in *Handbook on Semiconductors Volume 2: Optical Properties of Solids*, M. Balkanski, ed. North-Holland Publishing Company, New York, NY, pp. 181-222 (1980).

Lopez et al., "Erbium Emission from Porous Silicon One-Dimensional Photonic Band Gap Structures," *Appl. Phys. Lett.* 77:3704-3706 (2000).

Sugiyama et al., "Microstructure and Lattice Distortion of Anodized Porous Silicon Layers," *J. Cryst. Growth* 103:156-163 (1990).

Kim et al., "Effective Method for Stress Reduction in Thick Porous Silicon Films," *Appl. Phys. Lett.* 80:2287-2289 (2002).

Lugo et al., "Porous Silicon Multilayer Structures: A Photonic Band Gap Analysis," *J. Appl. Phys.* 91:4966-4972 (2002).

Hirschman et al., "Silicon-Based Visible Light-Emitting Devices Integrated Into Microelectric Circuits," *Nature* 384:338-341 (1996).

Young et al., "X-Ray Double Crystal Diffraction Study of Porous Silicon," *Appl. Phys. Lett.* 46:1133-1135 (1985).

Savage, N., "Linking with Light," *IEEE Spectrum* 39:32-36 (2002).

Painter et al., "Two-Dimensional Photonic Band-Gap Defect Mode Laser," *Science* 284:1819-1821 (1999).

Reece et al., "Optical Microactivities with Subnanometer Linewidths Based on Porous Silicon," *Appl. Phys. Lett.* 81:4895-4897 (2002).

Lee et al., "Operation of Photonic Crystal Membrane Lasers Above Room Temperature," *Appl. Phys. Lett.* 81:3311-3313 (2002).

John, S., "Strong Localization of Photons in Certain Disordered Dielectric Superlattices," *Phys. Rev. Lett.* 58:2486-2489 (1987).

Weiss et al., "Electrically Tunable Silicon-Based Mirrors," *Proc. of SPIE* 4654:36-44 (2002).

Lin et al., "Demonstration of Highly Efficient Waveguiding in a Photonic Crystal Slab at the 1.5-μm Wavelength," *Opt. Lett.* 25:1297-1299 (2000).

Theiβ, W., "Optical Properties of Porous Silicon," *Surf. Sci. Rep.* 29:91-192 (1997).

Zhou et al., "The Effect of Thermal Processing on Multilayer Porous Silicon Microactivity," *Phys. Stat. Sol. A* 182:319-324 (2000).

Weiss et al., "Temperature Stability for Silicon-Based Photonic Band-Gap Structures," *Applied Physics Letters* 83:1980-1982 (2003).

DeLouise, Lisa, [http://www.futurehealth.rochester.edu/miller_group/people/lisa_delouise.html] Miller Research Group pp. 1-4 (2004).

S.M. Weiss, "Control of One-Dimensional Photonic Bandgap Thermal Tuning," *Phys. Stat. Sol.* pp. 1-5 (Unpublished).

Grayson, M., ed., *Encyclopedia of Semiconductor Technology*, John Wiley and Sons, New York, pp. 374 (1984).

Barla et al., "Determination of Lattice Parameter and Elastic Properties of Porous Silicon By X-Ray Diffraction," *Growth* 68:727-732 (1984).

Birner et al., "Silicon-Based Photonic Crystals," *Adv. Mater.* 13:377-389 (2001).

Striemer et al., "Dynamic Etching of Silicon for Broadband Antireflection Applications," *Appl. Phys. Lett.* 81:2980-2982 (2002).

* cited by examiner

METHOD FOR CONTROLLING ONE OR MORE TEMPERATURE DEPENDENT OPTICAL PROPERTIES OF A STRUCTURE AND A SYSTEM AND PRODUCT THEREOF

This application claims the benefit of U.S. Provisional Patent Application Ser. No. 60/463,876 filed Apr. 17, 2003 which is hereby incorporated by reference in its entirety.

This invention was developed with government funding from the Air Force Office Of Scientific Research under agreement no. f49620-02-1-0376. The U.S. Government may have certain rights.

FIELD

This invention generally relates to photonic band-gap structures and, more particularly, to a method for controlling one or more temperature dependent optical properties in a photonic band-gap structure and a system and resulting product thereof.

BACKGROUND

For more than a decade, photonic band-gap (PBG) structures have received a great deal of attention due to their ability to control the propagation of light as disclosed in E. Yablonovitch, Phys. Rev. Lett. 58, 2059 (1987); S. John, Phys. Rev. Lett. 58, 2486 (1987), which is herein incorporated by reference in its entirety. A photonic band-gap device is a macroscopic, periodic dielectric structure that possesses spectral gaps (stop bands) for electromagnetic waves, in analogy with the energy bands and gaps in regular semiconductors. PBG materials possess a periodic dielectric function that creates a range of wavelengths in which light cannot travel. Inserting a defect into the PBG structure breaks the periodicity of the dielectric function and introduces a passband into the transmission spectrum. Fabrication of PBG filters, mirrors, waveguides and lasers has already been demonstrated and these devices are expected to enhance performance in optoelectronic and telecommunications applications as disclosed in A. Birner, R. B. Wehrspohn, U. Gösele, K. Busch, Adv. Mater. 13, 377 (2001); S. Y. Lin, E. Chow, S. G. Johnson, J. D. Joannopoulos, Opt. Lett. 25, 1297 (2000); O. Painter, R. K. Lee, A. Scherer, A. Yariv, J. D. O'Brien, P. D. Dapkus, I. Kim, Science 284, 1819 (1999), which are herein incorporated by reference in their entirety. Among the different materials used to prepare such structures, porous silicon (PSi) is very promising due to its low cost, compatibility with microelectronic technology as disclosed in K. D. Hirschman, L. Tsybeskov, S. P. Duttagupta, and P. M. Fauchet, Nature 384, 338 (1996), which is herein incorporated by reference in its entirety, and ability to modulate its refractive index as a function of depth as disclosed in C. C. Striemer and P. M. Fauchet, Appl. Phys. Lett. 81, 2980 (2002), which is herein incorporated by reference in its entirety. Silicon-based PBG devices could have a significant impact as optical interconnects and switches in the next generation of microelectronic technology as disclosed in A. Birner, R. B. Wehrspohn, U. Gösele, K. Busch, Adv. Mater. 13, 377 (2001) and N. Savage, IEEE Spectrum 39, 32 (2002) which are herein incorporated by reference in their entirety. However, before direct applications appear, some key issues remain to be resolved. In particular, as PBG technology matures, temperature stability needs to be addressed as disclosed in P. T. Lee, J. R. Cao, S. J. Choi, Z. J. Wei, J. D. O'Brien, P. D. Dapkus, Appl. Phys. Lett. 81, 3311 (2002), which is herein incorporated by reference in its entirety. It is critical to the operation of PBG devices that the wavelengths of the forbidden band do not drift when the device is exposed to a variable temperature range. Such a drift could cease the flow of light in the structure.

For example, in PSi microcavities, the position of the reflectance resonance is highly sensitive to changes in the refractive index. Since the refractive index of silicon is temperature dependent, even a small change in temperature could alter light confinement in the PBG. For silicon-based microcavities with very narrow line widths (i.e., ~1 nm) as disclosed in P. J. Reece, G. Lerondel, W. H. Zheng, and M. Gal, Appl. Phys. Lett. 81, 4895 (2002), which is herein incorporated by reference in its entirety, this temperature sensitivity becomes even more critical. The operation of an optical switch based on such a structure could change from an off-state to an on-state with small fluctuations in temperature.

SUMMARY

A method for controlling one or more temperature dependent optical properties of a structure in accordance with embodiments of the present invention includes heating at least a portion of a photonic band-gap structure and oxidizing the portion of the photonic band-gap structure during the heating to alter at least one temperature dependent optical property of the stack. For example, the heating and the oxidizing can make at least one property of the photonic band-gap structure substantially insensitive to temperature changes.

A system for controlling one or more temperature dependent optical properties of a structure in accordance with embodiments of the present invention includes a heating system and an oxidizing system. The heating system heats at least a portion of a photonic band-gap structure and the oxidizing system oxidizes this portion during the heating to alter at least one temperature dependent optical property of the stack. For example, the heating and the oxidizing make at least one property of the photonic band-gap structure substantially insensitive to temperature changes.

A photonic band-gap device in accordance with embodiments of the present invention includes two or more first silicon layers and two or more second silicon layers. Each of the first silicon layers is adjacent one of the second silicon layers to form a period and each of the second silicon layers has a higher porosity then the adjacent first silicon layer. Two or more of the periods adjacent each other form a stack which has been heated and oxidized to alter at least one temperature dependent optical property of the stack. For example, the property can be made substantially insensitive to temperature changes.

The present invention controls or alters one or more temperature dependent optical properties of a PBG structure, such as by minimizing the thermally induced drift of the reflectance spectra of PBG structures. As a result, the operation of silicon-based photonic band-gap devices, such as filters, mirrors, waveguides, light-emitting diodes, photodetectors, optical interconnects, switches and lasers, are substantially insensitive to temperature changes. Additionally, the present invention eliminates the cost, integration, and real estate complications associated with additional temperature-stabilizing components required by prior systems.

DETAILED DESCRIPTION

Figure 1:
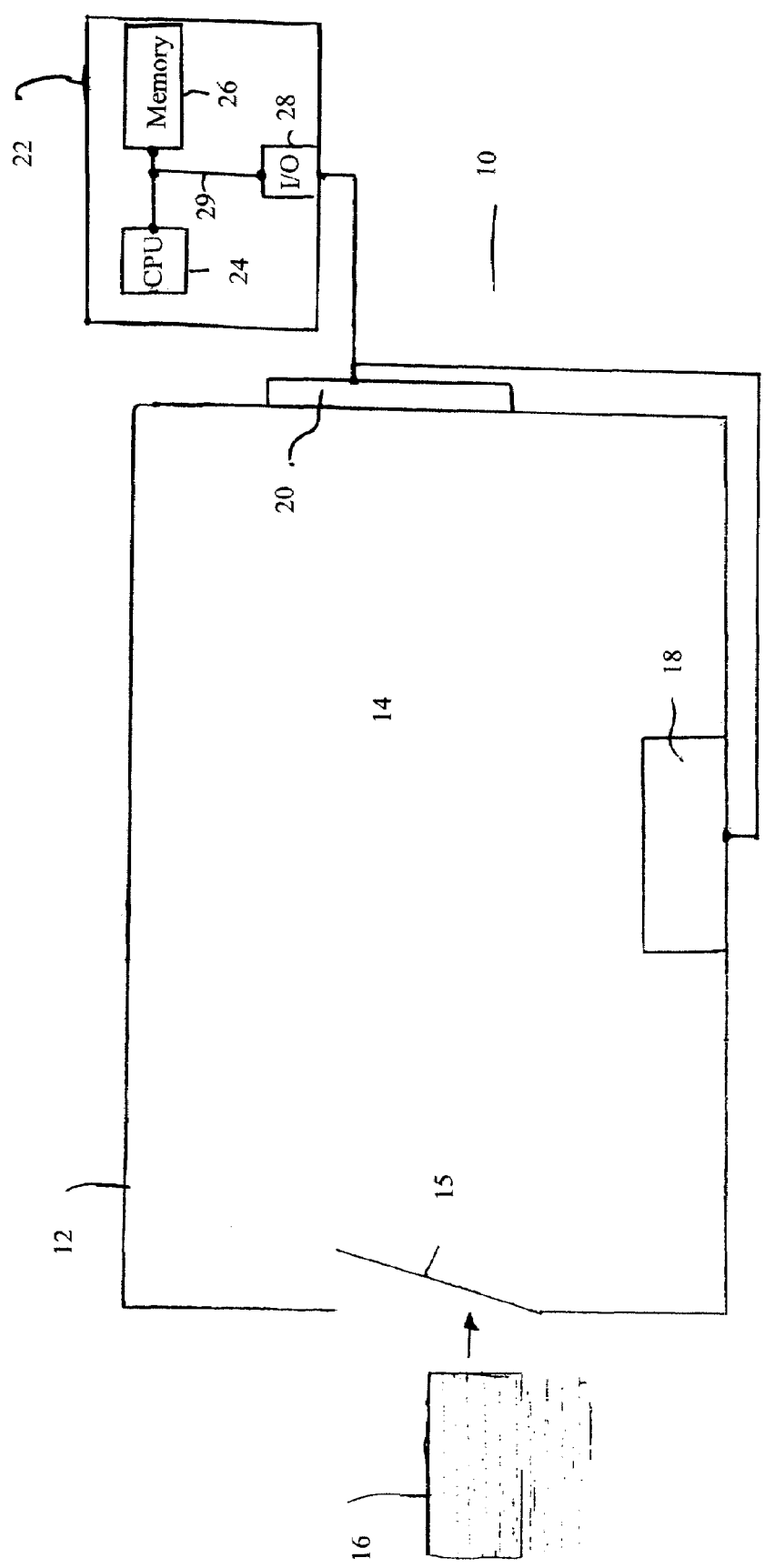
FIG. 1 is a block diagram of a system for controlling one or more temperature dependent optical properties of a PBG structure in accordance with embodiments of the present invention.
Figure 2:
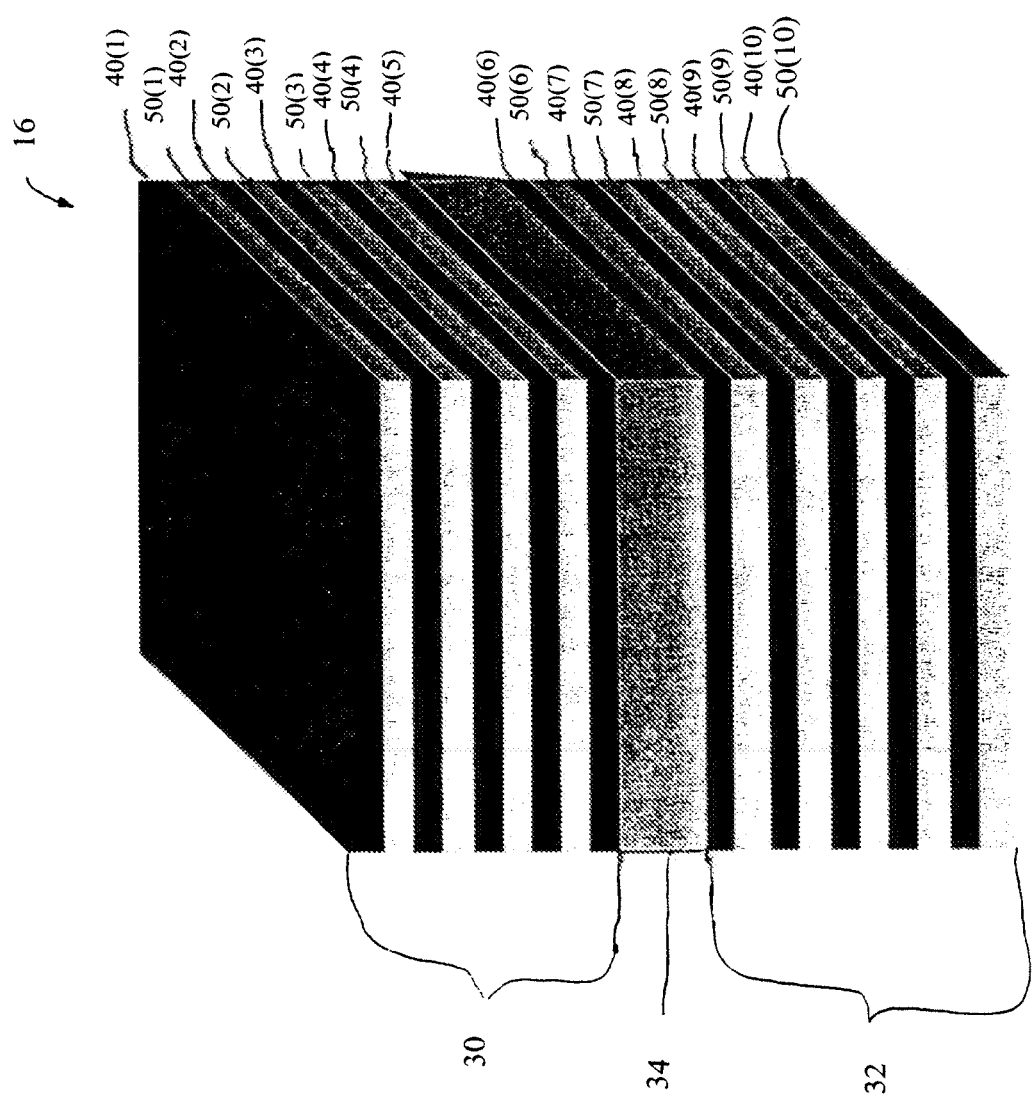
FIG. 2 is a perspective view of a PSi microcavity in accordance with embodiments of the present invention.
Figure 3:
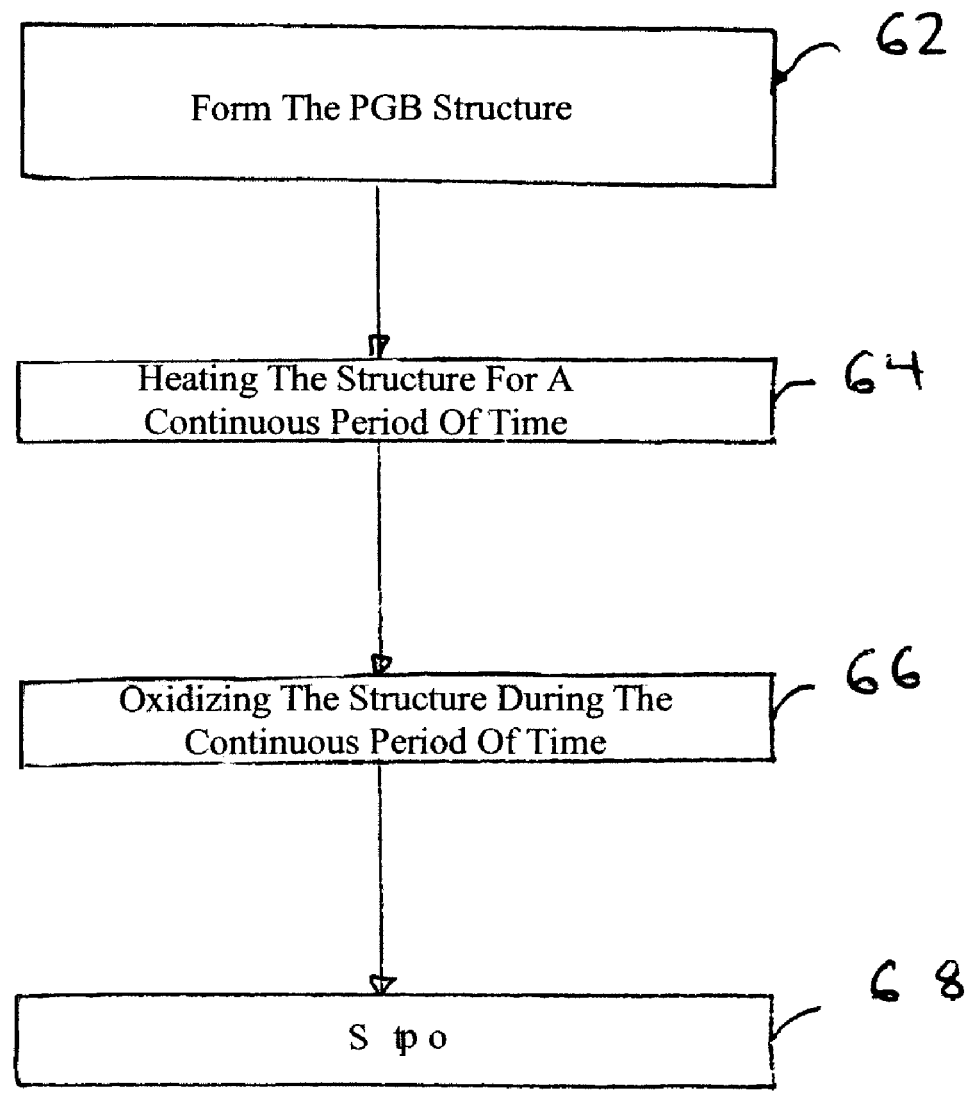
FIG. 3 is a flow chart of a method for controlling one or more temperature dependent optical properties of a PBG structure in accordance with embodiments of the present invention.

A system 10 and method for controlling one or more temperature dependent optical properties of a PBG structure or device 16 in accordance with embodiments of the present invention is illustrated in FIGS. 1-3. The system 10 includes a furnace 12 with a chamber 14 and a heating device 18 and an oxidizing device 20, although the system 10 can comprise other numbers and types of elements in other configurations. The present invention provides a number of advantages including minimizing the thermally induced drift of the reflectance spectra of a PBG structure 16.

Referring to FIG. 1, the furnace 12 includes a chamber 14 with a door 15 which are both sized to receive the PBG structure 16, although types of configurations for the furnace 12 can be used. The furnace 12 is used to anneal and oxidize the PBG structure 16 in the chamber 14 to control one or more temperature dependent optical properties of the PBG structure 16, although other types of devices for annealing or heating and oxidizing the PBG structure 16 could be used. By way of example only, in this particular embodiment the furnace is a Lindberg 55346 tube furnace.

The furnace 12 also includes a heating device 18 and an oxidizing device 20 which are positioned within the chamber 14, although other types of devices and other locations and configurations for these devices can be used. With the heating device 18, the furnace 12 is heated to a temperature of about 900 degrees Centigrade and can reach a temperature of about 1100 degrees Centigrade for an annealing process, although the furnace 12 can be configured to operate at other temperatures. The oxidizing device 20 provides a flow of one or more gases, such as $O_2$ or $N_2$, into the chamber 14 in the furnace 12 via an inlet at one end of the chamber 14 for an oxidation process. The gas or gases in the chamber 14 can be at various atmospheric pressures, such as at one atmosphere, if desired.

A control system 22 includes a central processing unit (CPU) 24, a memory 26, and an input/output (I/O) interface device 28 which are coupled together by a bus 29, although the control system 22 can comprise other types of components in other configurations. Additionally, the heating device 18 and oxidizing device 20 can be controlled in other manners, such as with manually operated controls on each device. The CPU 24 execute one or more programs of stored instructions for at least a portion of the method for controlling one or more temperature dependent optical properties of a structure in accordance with the present invention as described herein and illustrated in FIG. 3. In this particular embodiment, those programmed instructions are stored in memory 26 and are executed by executed by CPU 24, although some or all of those programmed instructions could be stored and retrieved from and also executed at other locations. A variety of different types of memory storage devices can be used for memory 26. The I/O interface device 28 is used to couple communications between the control system 22 and the heating device 18 and oxidizing device 20.

Figure 7:
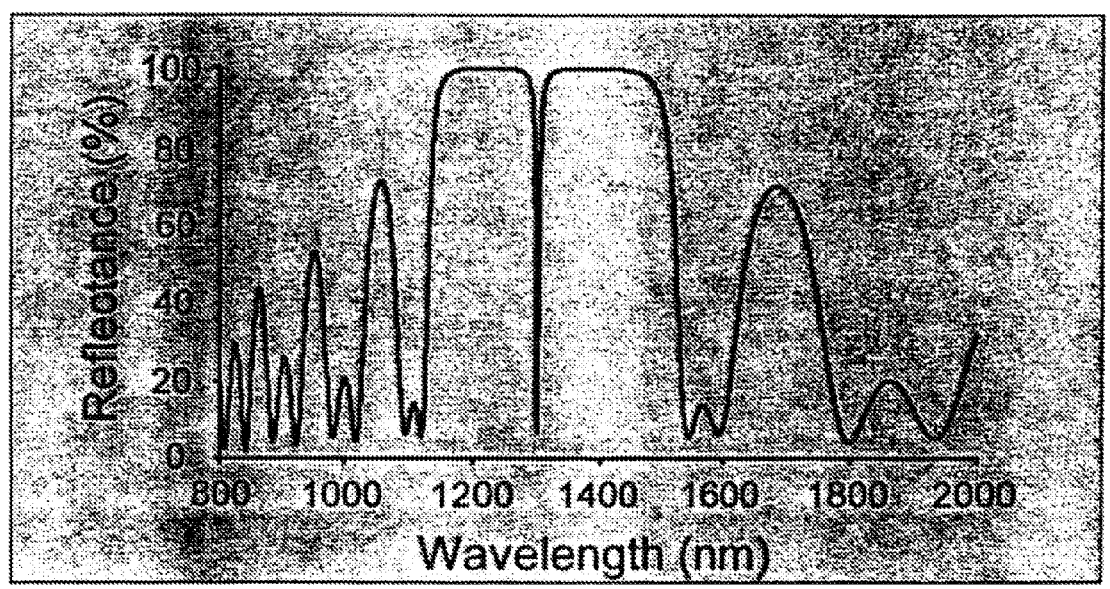
FIG. 7 is a graph of a simulation of the reflectance resonance versus wavelength of the PBG structure shown in FIG. 3.

Referring to FIG. 2, the PBG structure 16 comprises a PSi photonic band-gap microcavity, although other types of structures can be used. A microcavity is a PBG structure with a narrow passband band within a stop band. By way of example only, a graph of the reflectance versus the wavelength for the PBG structure 16 shown in FIG. 7 illustrates a narrow passband at about 1300 nm in a stop band between about 1150 nm and 1550 nm, although the PBG structure could have other ranges for the passband and stop band.

Referring back to FIG. 2, the PBG structure 16 has a first stack 30 and a second stack 32 separated by a defect layer 34, although the PBG structure 16 can have other elements and in other configurations. The PBG structure 16 is treated as described herein to have a reflectance spectra or resonance that is substantially insensitive to temperature changes, although other optical dependent properties of the PBG structure can be made substantially insensitive to temperature changes.

The first stack 30 has alternating layers of low porosity silicon 40(1)-40(5) and high porosity silicon 50(1)-50(4), although the first stack 30 can comprise other types of layers and other configurations. Each combination of one of the layers of low porosity silicon 40(1)-40(4) and the adjacent one of the layers of high porosity silicon 50(1)-50(4) is referred to as a period. A stack of one or more periods is called a Bragg mirror or Bragg reflector. In this particular embodiment, the first stack 30 is a Bragg mirror with four periods with an additional layer of low porosity silicon 40(5) adjacent the defect layer 34, although other number of periods and other configurations can be used.

The second stack 32 has alternating layers of low porosity silicon 40(6)-40(10) and high porosity silicon 50(6)-50(10), although the second stack 32 can comprise other types of layers and other configurations. Each combination of one of the layers of low porosity silicon 40(6)-40(10) and the adjacent one of the layers of high porosity silicon 50(6)-50(10) is also referred to as a period. Again, a stack of one or more periods is called a Bragg mirror or Bragg reflector. In this particular embodiment, the second stack 32 is a Bragg mirror with five periods, although other number of periods and other configurations can be used.

The layers of low porosity silicon 40(1)-40(10) have a 50% porosity and a quarter wavelength optical thickness, although other percentages of porosity and other thicknesses can be used. The layers of high porosity silicon 50(1)-50(4) and 50(6)-50(10) have a 70% porosity and a quarter wavelength optical thickness in this embodiment, although other percentages of porosity and other thickness also can be used.

The defect layer 34 is another layer of porous silicon, with a different thickness and porosity than the Bragg mirror layers, i.e. stacks 30 and 32, although other types and numbers of layers could be used. The defect layer 34 has a 75% porosity and a half wavelength optical thickness in this particular embodiment, although other percentages of porosity and optical thicknesses can be used, such as about a quarter wavelength optical thickness or any multiple of the about quarter wavelength optical thickness, i.e. a half or three quarter wavelength optical thickness.

Referring to FIG. 3, a method for controlling one or more temperature dependent optical properties of a PBG structure 16 in accordance with embodiments of the present invention will now be described.

In step 62, the PBG structure 16 with the stacks 30 and 32 and defect layer 34 are arranged and formed as illustrated and described with reference to FIG. 2, although other types of structures could be formed. Details of the formation of these layers 40(1)-40(1), 50(1)-50(4), and 50(6)-50(10) of t PBG structure 16 is described in greater detail in S. M. Weiss, P. M. Fauchet, Proc. of SPIE 4654, 36 (2002), which is herein incorporated by reference in its entirety.

In step 64, the heating device 18 alternately heats or anneals the PBG structure 16 in the chamber 14 and then allows the PBG structure to cool, although other types of heating devices and heating techniques can be used. This heating or annealing process should provide a sufficient warm up/cool down period and a long enough push and pull of the PBG structure 16 to and from the center of the chamber 14 so that excessive stresses in the PBG structure 16 are not generated from exposure to a high thermal gradient. Additionally, the total duration of the oxidation combined with the temperature of the furnace 12, the gas or gases flowed into the furnace 12 by the oxidizing device 20, and the flow rate of the gas from the oxidizing device 20 needs to be calibrated so that the proper amount of oxide is grown. The proper amount of oxide grown will depend on the particular structure being treated. By way of example only, in this particular embodiment the PBG structure 16 is: (1) warmed up at an edge of the chamber 14 in the furnace 12 for about four minutes; (2) pushed to the center of the chamber 14 over a period of about one minute and thirty seconds; (3) left in the center of the chamber 14 for about three minutes; (4) pulled out from the center of the chamber 14 over a period of about one minute and thirty seconds; and (5) cooled down at an edge of the chamber for about four minutes, although other parameters for this annealing process can be used.

Meanwhile, in step 66 the oxidizing device 20 oxidizes the PBG structure 16 is in the chamber 14 of the furnace 12, although other types of gases, such as $O_2$ at about one atmosphere, and techniques for oxidizing the PBG structure can be used. More specifically, the oxidizing device 20 oxidizes the PBG structure 16 in $N_2$ at about one atmosphere for about ten minutes, although other types of gases, such as $O_2$, other pressures, and other techniques for oxidizing the PBG structure can be used. Oxidation of the PBG structure 16 with $N_2$ occurs because of the oxygen resident in the PBG structure 16 and possibly residual oxygen in the chamber 14 of the furnace 12. The operation of the heating device 18 and the oxidizing device 20 as described herein is controlled by control system 22, although other manners for controlling heating device 18 and the oxidizing device 20, such as an operator using manual controls on the furnace 12, heating device 18, and oxidizing device 20 can be used.

By oxidizing and annealing the PBG structure 16, the reflectance spectra of the PBG structure 16 is substantially insensitive to change in temperature between about 0 degrees Centigrade up to about 100 degrees Centigrade, although other optical dependent properties of the PBG structure 16 can be made insensitive to changes in temperature, other temperature ranges can be used, and the heating and/or oxidizing can be used to enhance a temperature dependent optical property of the structure. In this example, the reflectance spectra of the PBG structure 16 will not change more than about +/−0.5 nm. At step 68 the process is completed.

Accordingly, the present invention provides a method for minimizing thermally induced drift of reflectance spectra in silicon-based PBG structures. As a result, the operation of silicon-based photonic band-gap structures, such as filters, mirrors, waveguides, light-emitting diodes, photo-detectors, optical interconnects, switches and lasers, are substantially insensitive to temperature changes. Additionally, the present invention eliminates the cost, integration, and real estate complications associated with additional temperature-stabilizing components required by prior systems By way of example only, set forth below is a characterization of various results obtained with different exemplary embodiments of the invention. In order to observe the thermal effects in these exemplary embodiments, a heating and temperature measurement system was created for each PBG structure, such as a microcavity. A current passing through two resistors attached to the back of the structure generated the necessary heat and a thermistor, also attached on the back, was used as the temperature sensing tool. The specular reflectance of all samples was measured with a Perkin-Elmer Lambda 900 spectrophotometer. A high-resolution diffractometer, such as a Phillips MRD, using a four-reflection Ge monochromator for the Cu $K\alpha_1$ radiation from an x-ray tube is used for the x-ray diffraction experiments. Rocking curve measurements in which the sample angle ω is varied have been performed.

Figure 4A:
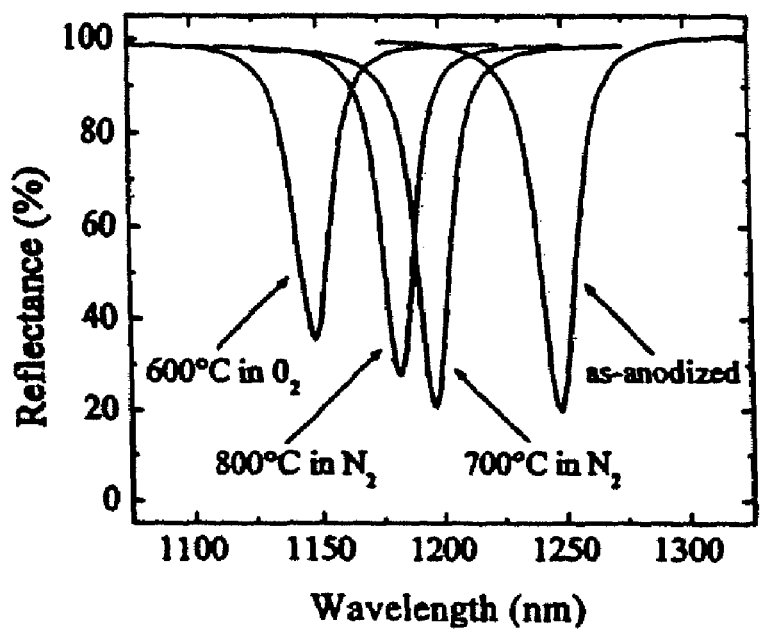
FIG. 4A is a graph of reflectance resonances of PSi microcavities with different oxidation treatments measured at room temperature.

Referring to FIG. 4A, the reflectance spectra of different silicon-based PBG structures, which are microcavities in this example, at room temperature are shown. The position of the resonance depends on the oxidation conditions. As the annealing temperature and atmospheric oxygen content increase, the magnitude of the reflectance blueshift increases. This blueshift with oxidation is produced by a decrease of the refractive index that occurs when the outer layers of the silicon rods are converted to oxide. The more the sample is oxidized, the larger the blueshift as disclosed in H. A. Lopez and P. M. Fauchet, Appl. Phys. Lett. 77, 3704 (2000); J. E. Lugo, H. A. Lopez, S. Chan, and P. M. Fauchet, J. Appl. Phys. 91, 4966 (2002), which are herein incorporated by reference in their entirety. Fourier Transform Infrared (FTIR) experiments confirmed that microcavities exhibiting larger reflectance blueshifts have higher oxygen contents and the samples annealed in nitrogen possess very low oxygen levels. Secondary ion mass spectrometry measurements indicate that oxidation in flowing nitrogen simply implies a lower oxygen concentration. Thermal desorption spectrometry measurements also support this claim. The surface stress induced by the oxide coverage of the silicon matrix provides a counterforce which serves to decrease the refractive index as a function of temperature. Therefore, depending on the degree of oxidation achieved, a redshift, no shift, or a blue shift of the resonance wavelength can result when the silicon-based PBG structure is heated. The ability to control the thermal effects of the host PBG structure allows for overall control of the tuning of these structures.

Figure 4B:
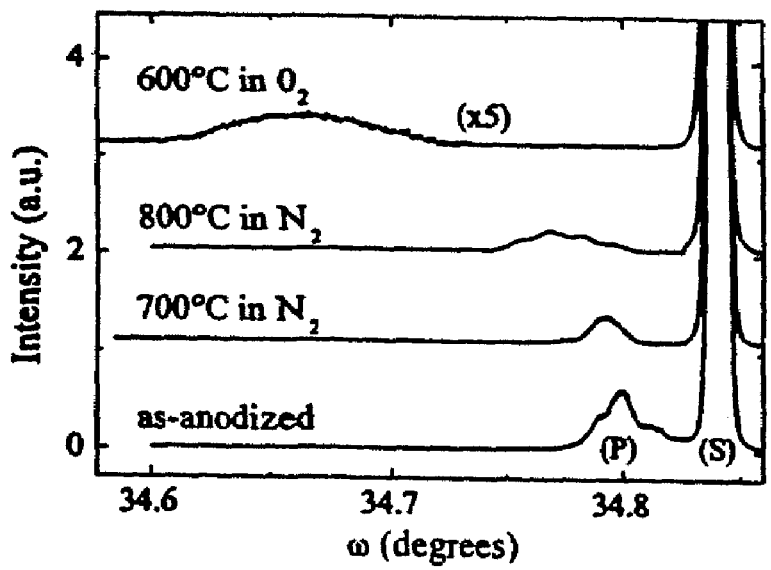
FIG. 4B is a graph of x-ray diffraction spectra of PSi microcavities with different oxidation treatments measured at room temperature.

Referring to FIG. 4B, x-ray diffraction results also show the effects of various oxidation levels. Two distinct diffraction peaks are observed with rocking curves corresponding to the reflection of each PSi sample exhibit. The peak at higher angle (S) corresponds to the silicon substrate while the one at lower angle (P) is due to the PSi layers as disclosed in K. Barla, R. Herino, G. Bomchil, J. C. Pfister, A. Freund, J. Cryst. Growth 68, 727 (1984), which is herein incorporated by reference in its entirety. The greater the oxidation, the more the PSi peak deviates from the silicon peak. The difference $\Delta\omega$ between the two angular positions is directly related to the lattice mismatch parameter $\Delta a/a$ in the direction perpendicular to the sample surface by the relation: $\Delta a/a = -\Delta\omega/\tan\omega_b$, where $\omega_b$ is the Bragg angle for the reflection. All measured values of $\Delta a/a$ for our microcavities are positive, which corresponds to compressive stress and an expansion of the lattice parameter in the direction perpendicular to the sample surface. The measured value of $\Delta a/a$ increases from $1\times10^{-3}$ for the as-anodized microcavity to $4.3\times10^{-3}$ for the microcavity annealed in $O_2$ at 600° C. The compressive stress for the as-anodized sample has been attributed to hydrogen coverage of the silicon rods as disclosed in H. Sugiyama, O. Nittono, J. Cryst. Growth 103, 156 (1990); D. Buttard, G. Dolino, C. Faivre, A. Halimaoui, F. Comin, V. Formoso, L. Ortega, J. Appl. Phys. 85, 7105 (1999), which are herein incorporated by reference in their entirety and the increase of $\Delta a/a$ is due to a thicker oxide layer as disclosed in I. M. Young, M. J. Beale, J. D. Benjamin, Appl. Phys. Lett. 46, 1133 (1985); D. Buttard, D. Bellet, G. Dolino, J. Appl. Phys. 79, 8060 (1996), which are herein incorporated by reference in their entirety.

Figure 5:
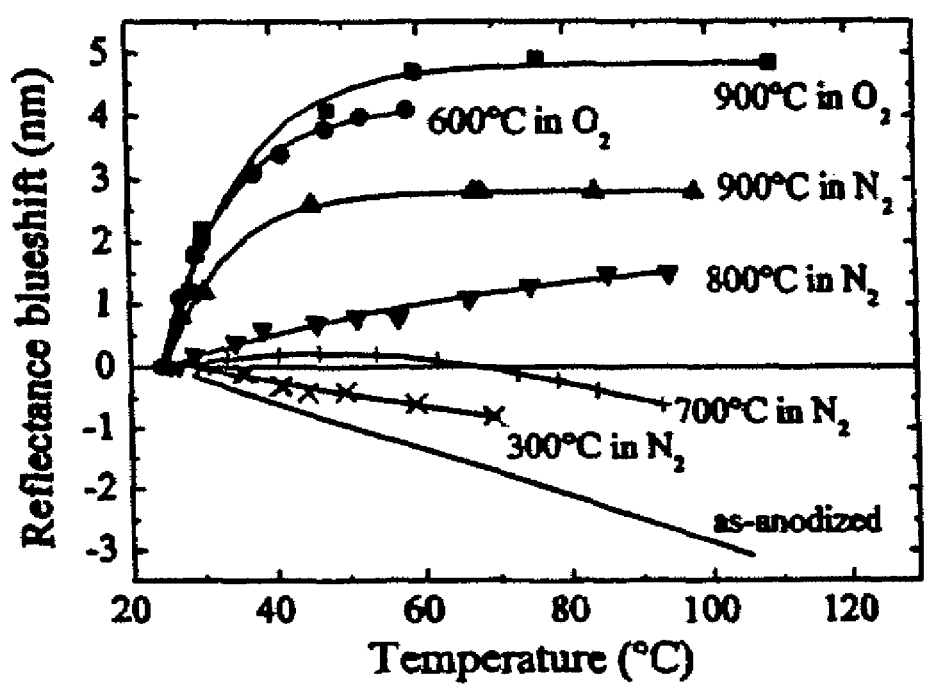
FIG. 5 is a graph of reflectance resonance shifts of PSi microcavities having various oxidation levels measured during subsequent heating of each sample to different temperatures.

Referring to FIG. 5, the reflectance resonance shifts of PSi microcavities with various oxidation levels during subsequent heating of each sample over a temperature range of 25° C.-100° C. are displayed. The curves are reproducible under multiple heating and cooling cycles. The as-anodized microcavity exhibits a systematic redshift up to 3 nm at 100° C. When the microcavity is annealed in $N_2$ at 700° C., the resonance position is nearly unchanged with a maximum shift of ±0.5 nm during heating up to 100° C. Thus, this is the condition that yields a temperature insensitive microcavity. For microcavities with higher oxidation levels, the resonance progressively blueshifts with heating and the magnitude becomes quite significant for the films annealed in $O_2$.

Figure 6:
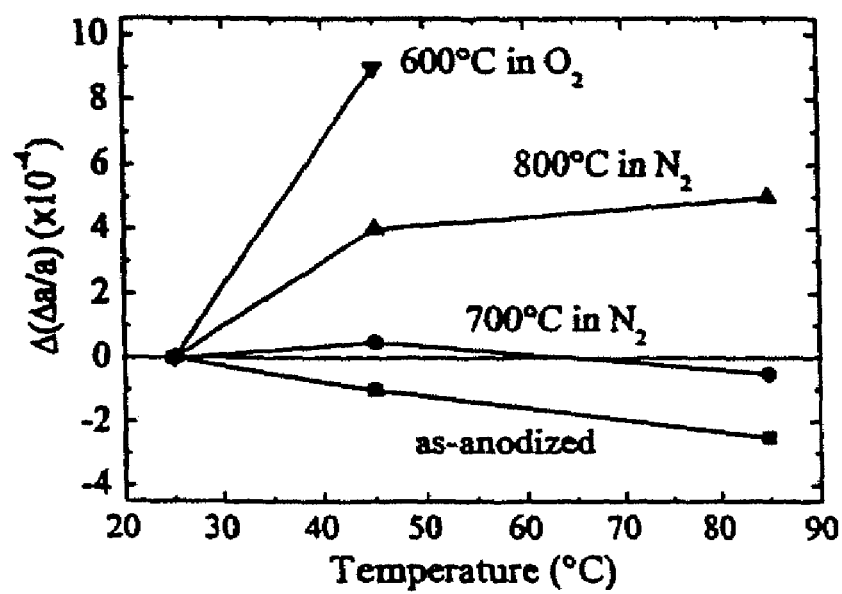
FIG. 6 is a graph of change in lattice parameter of PSi microcavities with heating.

Referring to FIG. 6, the evolution of the lattice parameter with heating is shown. While $\Delta a/a$ decreases for the as-anodized sample, indicating a contraction of the lattice parameter, the lattice parameter of the microcavity annealed at 700° C. in $N_2$ only changes slightly during heating. This key result is consistent with the temperature insensitive reflectance measurements for a microcavity with the same oxidation level. When the oxygen content of the PSi microcavities is increased further, an expansion of the lattice parameter is observed during heating.

The experimental results of the resonance shifts and the variations of the lattice parameter shown in FIGS. 5 and 6 are clearly correlated. In order to explain why the oxidation condition of 700° C. in $N_2$ leads to temperature insensitive microcavities, the causes of the reflectance and lattice parameter changes must be explained. The position of the microcavity resonance depends on the refractive indices of the constituent PSi layers. The variation of the silicon refractive index during heating can be expressed as a function of temperature and pressure:

$$\Delta n = \frac{dn}{dT}\Delta T + \frac{dn}{dP}\Delta P \qquad (1)$$

The term depending on temperature is always positive and increases during heating($dn/dT \sim 2\times10^{-4}$ K$^{-1}$) as disclosed in G. E. Jellison, H. H. Burke, J. Appl. Phys. 60, 841 (1986), which is herein incorporated by reference in its entirety. However, the sign of the term depending on pressure, with $dn/dP \sim -10^{-11}$ Pa$^{-1}$, varies based on the sign of $\Delta P$ during heating as disclosed in G. Martinez, in *Handbook on Semiconductors Volume 2: Optical Properties of Solids*, M. Balkanski, ed. North-Holland Publishing Company, New York, N.Y., 1980, which is herein incorporated by reference in its entirety. Consequently, proper oxidation conditions can induce a change of the surface stress that is consistent with a pressure effect counterbalancing the temperature dependence of the refractive index.

From the data presented in FIGS. 5 and 6, the present invention verifies that the trends and relative magnitudes of pressure generated in the PSi microcavities are in agreement with the measured reflectance shifts with heating. Based on FIG. 5, it can be determined that the as-anodized sample undergoes $\Delta n \sim 0.013$ as it is heated up to 85° C. as disclosed in S. M. Weiss, P. M. Fauchet, Proc. of SPIE 4654, 36(2002), which is herein incorporated by reference in its entirety. Using equation one, the present invention finds that the temperature-dependent term dominates the refractive index change and, thus, reflectance shift and $\Delta P$ should be on the order of $-0.14$ GPa. Since lattice contraction in the direction perpendicular to the sample surface implies decreasing pressure, FIG. 6 confirms that a small decreasing pressure is indeed present in the as-anodized sample. A similar analysis can be followed for the oxidized samples. In the case of the PSi microcavity annealed at 800° C. in $N_2$, $\Delta n \sim -0.010$ so a dominant pressure term on the order of $\Delta P \sim 2.2$ GPa is required to account for the reflectance resonance blueshift. Once again, the corresponding curve on FIG. 6 is consistent since a lattice expansion in the direction perpendicular to the sample surface implies increasing pressure. Finally, for the temperature insensitive microcavity, the present invention recognizes that the small changes in the lattice spacing map directly to minor modulations of the reflectance resonance position.

Using a change in pressure to balance the effect of temperature on refractive index can be an effective technique for achieving temperature stabilized silicon-based PBG components. The thermal coefficient of expansion mismatch between the silicon rods ($2.5\times10^{-6}$ K$^{-1}$) as disclosed in M. Grayson, ed., *Encyclopedia of Semiconductor Technology* John Wiley and Sons, New York, 1984, which is herein incorporated by reference in its entirety, and the covering oxide ($0.5\times10^{-6}$ K$^{-1}$) as disclosed in M. Grayson, ed., *Encyclopedia of Semiconductor Technology* John Wiley and Sons, New York, 1984, which is herein incorporated by reference in its entirety, enhanced stresses at the interfaces between the different porosity layers that each have different oxide coverage as disclosed in Y. Zhou, P. A. Snow, P. S. Russell, Phys. Stat. Sol. A 182, 319 (2000), which is herein incorporated by reference in its entirety, and possible molecular rearrangements on the surface as disclosed in K. Barla, R. Herino, G. Bomchil, J. C. Pfister, A. Freund, J. Cryst. Growth 68, 727 (1984); G. Bai, K. H. Kim, M. A.

Nicolet, Appl. Phys. Lett. 57, 2247 (1990), which are herein incorporated by reference in their entirety, contribute to the change in PSi lattice spacing with heating. An accurate and detailed model to determine the relative magnitudes of the various strains in the as-anodized and oxidized samples will require accounting for the complex morphology of PSi microcavities.

Figures 8A, 8B, 8C:
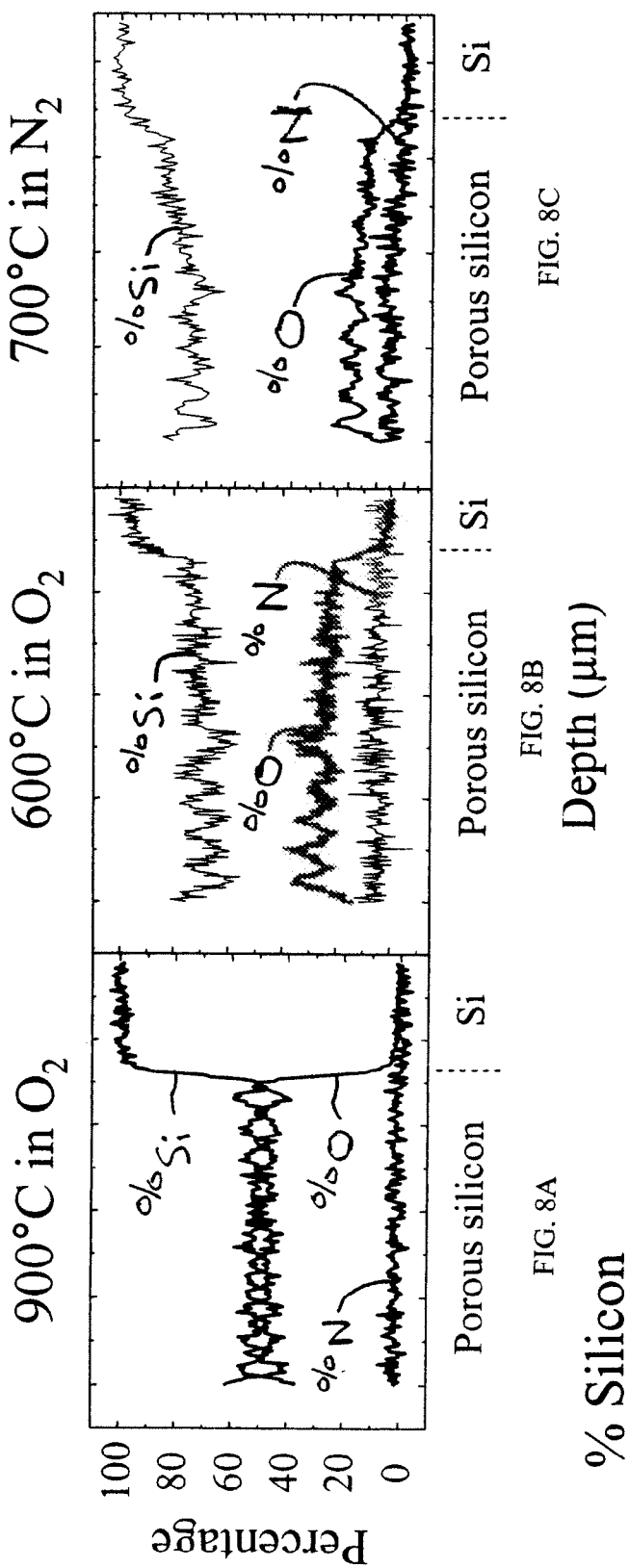
FIGS. 8A-8C are graphs of secondary ion mass spectrometry measurements which illustrate the relative percentages of silicon, oxygen, and nitrogen in microcavities for different oxidation conditions.

Again, to reduce the thermal drift of the reflectance spectra, an oxidation treatment is used. The ambient oxygen content along with the annealing temperature are adjusted to obtain a variable oxide thickness in the treated structure. Referring to FIGS. 8A-8C, graphs of secondary ion mass spectrometry measurements illustrate the relative percentages of silicon, oxygen, and nitrogen in microcavities for different oxidation and temperature conditions. More specifically, in FIG. 8A the oxidation and temperature conditions for the porous silicon are $O_2$ at 900 degrees Centigrade, in FIG. 8B the oxidation and temperature conditions for the porous silicon are $O_2$ at 600 degrees Centigrade, and in FIG. 8C the oxidation and temperature conditions for the porous silicon are $N_2$ at 700 degrees Centigrade. Oxidation in flowing nitrogen, instead of oxygen, simply decreases the percentage of oxygen in the microcavities.

Accordingly, different conditions of oxidation and annealing have been used on PSi microcavities. By choosing the appropriate treatment, the present invention has shown that it is possible to minimize the reflectance shift of the resonance that occurs for as-anodized microcavities during heating. Hence, the present invention has achieved temperature stability for one-dimensional PSi PBG microcavities. The general procedure of using a surface treatment to counterbalance the effects of temperature on refractive index should be useful for all silicon-based PBG structures.

Having thus described the basic concept of the invention, it will be rather apparent to those skilled in the art that the foregoing detailed disclosure is intended to be presented by way of example only, and is not limiting. Various alterations, improvements, and modifications will occur and are intended to those skilled in the art, though not expressly stated herein. These alterations, improvements, and modifications are intended to be suggested hereby, and are within the spirit and scope of the invention. Additionally, the recited order of processing elements or sequences, or the use of numbers, letters, or other designations therefore, is not intended to limit the claimed processes to any order except as may be specified in the claims. Accordingly, the invention is limited only by the following claims and equivalents thereto.

What is claimed is:

1. A method for controlling one or more temperature dependent optical properties of a structure, the method comprising:
    annealing at least a portion of a photonic band-gap structure, the annealing having at least a warming stage for a first controlled period of time, a heating stage for a second controlled period of time, and a cooling stage for a third controlled period of time; and
    oxidizing the at least a portion of the photonic band-gap structure during the annealing to alter at least one temperature dependent optical property of the photonic band-gap structure.

2. The method as set forth in claim 1 wherein the temperature dependent optical property of the photonic band-gap structure is made to be substantially insensitive to temperature changes.

3. The method as set forth in claim 2 wherein the property is a reflectance spectra of the photonic band-gap structure.

4. The method as set forth in claim 1 wherein the photonic band-gap structure is a microcavity.

5. The method as set forth in claim 4 wherein the microcavity comprises two Bragg mirrors separated by at least one defect layer.

6. The method as set forth in claim 1 wherein the oxidizing further comprises oxidizing the photonic band-gap structure in at least one of an atmosphere of $N_2$ and an atmosphere of $O_2$.

7. The method as set forth in claim 1 wherein the annealing further comprises heating the photonic band-gap device to a temperature of at least 300 degrees Celsius.

8. The method as set forth in claim 1 wherein the oxidizing further comprises oxidizing the photonic band-gap structure in a mixture comprising $N_2$ and $O_2$.

9. The method as set forth in claim 1 wherein the at least one temperature dependent optical property comprises a reflectance spectra of the photonic band-gap structure which has a maximum shift of about +/−0.5 nm for a temperature change up to about 100 degrees Centigrade.

10. The method as set forth in claim 1 further comprising controlling the annealing including the first, second and third controlled periods of time and the oxidizing to control the alteration of the at least one temperature dependent optical property of the photonic band-gap structure.

11. A method for controlling one or more temperature dependent optical properties of a structure, the method comprising:
    heating at least a portion of a photonic band-gap structure; and
    oxidizing the at least a portion of the photonic band-gap structure during the heating to alter at least one temperature dependent optical property of the photonic band-gap structure, the property comprising a reflectance spectra of the photonic band-gap structure which has a maximum shift of about +/−0.5 nm for a temperature change up to about 100 degrees Centigrade.

12. A system for controlling one or more temperature dependent optical properties of a structure, the system comprising:
    an annealing system that anneals at least a portion of a photonic band-gap structure, the annealing system having at least a warming stage for a first controlled period of time, a heating stage for a second controlled period of time, and a cooling stage for a third controlled period of time; and
    an oxidizing system that oxidizes the at least a portion of the photonic band-gap structure during the annealing to alter at least one temperature dependent optical property of the photonic band-gap structure.

13. The system as set forth in claim 12 wherein the temperature dependent optical property of the photonic band-gap structure is made to be substantially insensitive to temperature changes.

14. The system as set forth in claim 13 wherein the property is a reflectance spectra of the photonic band-gap structure.

15. The system as set forth in claim 12 wherein the photonic band-gap structure is a microcavity.

16. The system as set forth in claim 15 wherein the microcavity comprises two Bragg mirrors separated by at least one defect layer.

17. The system as set forth in claim 12 wherein the oxidizing system oxidizes the at least a portion of the photonic band-gap structure in at least one of an atmosphere of $N_2$ and an atmosphere of $O_2$.

18. The system as set forth in claim 12 wherein the annealing system heats the photonic band-gap device to a temperature of at least 300 degrees Celsius.

19. The system as set forth in claim 12 wherein the oxidizing system oxidizes the at least a portion of the photonic band-gap structure in a mixture comprising $N_2$ and $O_2$.

20. The system as set forth in claim 12 wherein the at least one temperature dependent optical property comprises a reflectance spectra of the photonic band-gap structure which has a maximum shift of about +/−0.5 nm for a temperature change up to about 100 degrees Centigrade.

21. The system as set forth in claim 12 further comprising a control system that controls the annealing system including the first, second and third controlled periods of time and the oxidizing system to control the alteration of the at least one temperature dependent optical property of the photonic band-gap structure.

22. A system for controlling one or more temperature dependent optical properties of a structure, the system comprising:
a heating system that heats at least a portion of a photonic band-gap structure; and
an oxidizing system that oxidizes the at least a portion of the photonic band-gap structure during the heating to alter at least one temperature dependent optical property of the photonic band-gap structure, the property comprising a reflectance spectra of the photonic band-gap structure which has a maximum shift of about +/−0.5 nm for a temperature change up to about 100 degrees Centigrade.

23. A photonic band-gap device comprising:
two or more first silicon layers; and
two or more second silicon layers, wherein each of the first silicon layers adjacent one of the second silicon layers forms a period and wherein each of the second silicon layers has a higher porosity then the adjacent first silicon layer;
wherein two or more of the periods adjacent each other form a stack, wherein the stack is annealed and oxidized to alter at least one temperature dependent optical property of the stack, wherein the stack is annealed by at least warming the stack for a first controlled period of time, heating the stack for a second controlled period of time, and cooling the stack for a third controlled period of time.

24. The device as set forth in claim 23 wherein the temperature dependent optical property of the photonic band-gap structure is made to be substantially insensitive to temperature changes.

25. The system as set forth in claim 24 wherein the property is a reflectance spectra of the photonic band-gap structure.

26. The device as set forth in claim 23 further comprising at least one defect layer between a pair of the stacks with the defect layer and stacks joined together.

27. The device as set forth in claim 26 wherein each of the stacks has about a quarter wavelength optical thickness.

28. The device as set forth in claim 26 wherein the defect layer comprises one of about a quarter wavelength optical thickness and any multiple of the about quarter wavelength optical thickness.

29. The device as set forth in claim 23 wherein one of the first and second silicon layers has a higher refractive index than the other one of the first and second silicon layers in each of the periods.

30. The device as set forth in claim 23 wherein the stack is oxidized in at least one of an atmosphere of $N_2$ and an atmosphere of $O_2$.

31. The device as set forth in claim 19 wherein the stack is annealed to a temperature of at least 300 degrees Celsius.

32. The device as set forth in claim 23 wherein the stack is oxidized in a mixture comprising $N_2$ and $O_2$.

33. The device as set forth in claim 23 wherein the at least one temperature dependent optical property comprises a reflectance spectra of the photonic band-gap structure which has a maximum shift of about +/−0.5 nm for a temperature change up to about 100 degrees Centigrade.

34. A photonic band-gap device comprising:
two or more first silicon layers; and
two or more second silicon layers, wherein each of the first silicon layers adjacent one of the second silicon layers forms a period and wherein each of the second silicon layers has a higher porosity then the adjacent first silicon layer;
wherein two or more of the periods adjacent each other form a stack, wherein the stack is heated and oxidized to alter at least one temperature dependent optical property of the stack, the property comprising a reflectance spectra of the stack which has a maximum shift of about +/−0.5 nm for a temperature change up to about 100 degrees Centigrade.

* * * * *